US008826439B1

(12) United States Patent
Hu et al.

(10) Patent No.: US 8,826,439 B1
(45) Date of Patent: Sep. 2, 2014

(54) ENCODING MACHINE CODE INSTRUCTIONS FOR STATIC FEATURE BASED MALWARE CLUSTERING

(75) Inventors: Xin Hu, Ann Arbor, MI (US); Kent E. Griffin, Santa Monica, CA (US); Sandeep B. Bhatkar, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 392 days.

(21) Appl. No.: 13/014,552

(22) Filed: Jan. 26, 2011

(51) Int. Cl.
*G06F 11/00* (2006.01)
*G06F 21/56* (2013.01)
(52) U.S. Cl.
CPC .................................. *G06F 21/56* (2013.01)
USPC .......................................................... 726/24
(58) Field of Classification Search
None
See application file for complete search history.

(56) References Cited

U.S. PATENT DOCUMENTS

| 7,873,947 | B1* | 1/2011 | Lakhotia et al. | 717/126 |
|---|---|---|---|---|
| 8,108,931 | B1* | 1/2012 | Witten et al. | 726/23 |
| 8,214,365 | B1* | 7/2012 | Manadhata et al. | 707/737 |
| 8,312,537 | B1* | 11/2012 | Nachenberg et al. | 726/22 |
| 8,321,942 | B1* | 11/2012 | Chiueh et al. | 726/24 |
| 2005/0172338 | A1* | 8/2005 | Sandu et al. | 726/22 |
| 2005/0192992 | A1* | 9/2005 | Reed et al. | 707/101 |
| 2006/0015630 | A1* | 1/2006 | Stolfo et al. | 709/230 |
| 2007/0094734 | A1* | 4/2007 | Mangione-Smith et al. | 726/24 |
| 2007/0294769 | A1* | 12/2007 | Bird | 726/24 |
| 2008/0127336 | A1* | 5/2008 | Sun et al. | 726/22 |
| 2009/0049549 | A1* | 2/2009 | Park et al. | 726/22 |
| 2009/0300765 | A1* | 12/2009 | Moskovitch et al. | 726/24 |
| 2010/0064369 | A1* | 3/2010 | Stolfo et al. | 726/24 |
| 2011/0029536 | A1* | 2/2011 | Knight et al. | 707/740 |

OTHER PUBLICATIONS

U Bayer, C Kruegel, E Kirda—15th Annual Conference of the European Institute, 2006.*
Moskovitch, Robert, et al., A cChronical Evaluation of Unknown Malcode Detection, 2009, PAISI2009, LNCS 5477 pp. 112-117.*
Abou-Assaleh, T. et al., "N-gram Based Detection of New Malicious Code," COMPSAC, 2004, [Online] [Retrieved on Apr. 22, 2011] Retrieved from the Internet<URL:http://explorer.cekli.com/articles/pdf>.
Abou-Assaleh, T. et al., "Detection of New Malicious Code Using N Grams Signatures," Second Annual Conference on Privacy, Security and Trust, 2004, pp. 193-196, [Online] [Retrieved on Jan. 27, 2011] Retrieved from the Internet<URL:http://explorer.cekli.com/articles/pdf/n-gram-based-detection-new-malicious-code>.

(Continued)

*Primary Examiner* — Farid Homayounmehr
*Assistant Examiner* — Olanrewaju Bucknor
(74) *Attorney, Agent, or Firm* — Fenwick & West LLP (57) ABSTRACT

Machine language instruction sequences of computer files are extracted and encoded into standardized opcode sequences. The standardized opcodes in the sequences are of the same length and do not include operands. A multi-dimension vector is generated as a static feature for each computer file, where each element in the vector corresponds to the number of occurrences of a unique N-gram (i.e., unique sequence of N consecutive standardized opcodes) in the standardized opcode sequence for that computer file. The computer files are clustered into clusters of similarly classified files based on similarities of their static features. An unknown computer file can be classified by first grouping the file into a cluster of files with similar static features (e.g., into the cluster with the shortest average distance), and then determining the classification of that file based on the classifications of other files that belong to the same cluster.

17 Claims, 5 Drawing Sheets

(56) References Cited

OTHER PUBLICATIONS

Bayer, U. et al., "Scalable, Behavior-Based Malware Clustering," 16th Symposium on Network and Distributed System Security, 2009, 18 pages, [Online] [Retrieved on Apr. 22, 2011] Retrieved from the Internet<URL:http://www.iseclab.org/papers/clustering_ndss.pdf>.

Karim, M.E. et al., "Malware Phylogeny Generation Using Permutations of Code," Journal of Computer Virology, 2005, [Online] [Retrieved on Apr. 22, 2011] Retrieved from the Internet<URL:http://citeseerx.ist.psu.edu/viewdoc/download?doi=10.1.1.61.7696&rep=rep1&type=pdf>.

Kolter, J.Z. et al., "Learning to Detect and Classify Malicious Executables in the Wild", Journal of Machine Learning Research, 2006, pp. 2721-2744, vol. 7.

Marino, J.B. et al., "N-Gram-Based Machine Translation," COMPSAC, 2004, Computational Linguistics, 2006, pp. 527-549, vol. 32, No. 4, [Online] [Retrieved on Jan. 27, 2011] Retrieved from the Internet<URL:http://explorer.cekli.com/articles/pdf/n-gram-based-detection-new-malicious-code>.

Moshchuk, A. et al., "SpyProxy: Execution-based Detection of Malicious Web Content," Proceedings of the 16th USENIX Security Symposium, 2007, 16 pages, [Online] [Retrieved on Jan. 27, 2011] Retrieved from the Internet<URL:http://explorer.cekli.com/articles/pdf/n-gram-based-detection-new-malicious-code>.

Rieck, K. et al., "Automatic Analysis of Malware Behavior Using Machine Learning," White Paper, CW Sunbelt Sandbox, 2009, pp. 1-32, [Online] [Retrieved on Apr. 22, 2011] Retrieved from the Internet<URL:http://www.sunbeltsoftware.com/documents/sunbelt-cwsandbox-malheur.pdf>.

Rieck, K., "Malheur—Manual Page," 2009-2011, 6 pages, [Online] [Retrieved on Apr. 22, 2011] Retrieved from the Internet<URL:http://www.mlsec.org/malheur/manual.html>.

Shafiq, M.Z. et al., "Embedded Malware Detection Using Markov n-grams," Lecture Notes in Computer Science, 2008, pp. 88-107, [Online] [Retrieved on Jan. 27, 2011] Retrieved from the Internet<URL:http://tuts4you.com/download.php?view.2997>.

Siddiqui, M.A. et al., "Data Mining Methods for Malware Detection," Ph.D. Dissertation, University of Central Florida, 2008, pp. 1-129, [Online] [Retrieved on Apr. 22, 2011] Retrieved from the Internet<URL:http://etd.fcla.edu/CF/CFE0002303/Siddiqui_Muazzam_A_200808_PhD.pdf>.

Siddiqui, M. et al., "A Survey of Data Mining Techniques for Malware Detection Using File Features," Proceedings of the 46th Annual Southeast Regional Conference, ACM, pp. 509-510.

Trinius, P. et al., "A Malware Instruction Set for Behavior-Based Analysis," Technical Report TR-2009-07, University of Mannheim, 2009, pp. 1-11, [Online] [Retrieved on Apr. 22, 2011] Retrieved from the Internet<URL:http://user.cs.tu-berlin.de/~rieck/docs/2009-mist.pdf>.

Walenstein, A. et al., "Exploiting Similarity Between Variants to Defeat Malware", BlackHat Briefings, 2007, pp. 1-12.

Wang, Y. et al., "An Improved Clustering Validity Index for Determining the Number of Malware Clusters," ASID'09 Proceedings of the 3rd International Conference on Anti-Counterfeiting, Security, and Identification in Communication, http://portal.acm.org/citation.cfm?id=1719239.

Wicherski, G., "peHash: A Novel Approach to Fast Malware Clustering," USENIX, Dec. 7, 2008, 10 pages, [Online] [Retrieved on Apr. 22, 2011] Retrieved from the Internet<URL:http://www.usenix.org/event/leet09/tech/full_papers/wicherski/wicherski_html/>.

Ye, Y. et al., "Automatic Malware Categorization Using Cluster Ensemble," KDD'10, ACM, Jul. 25-28, 2010, 10 pages, [Online] [Retrieved on Apr. 22, 2011] Retrieved from the Internet<URL:http://users.cs.fiu.edu/~taoli/pub/ind800n-Ye.pdf>

* cited by examiner

ENCODING MACHINE CODE INSTRUCTIONS FOR STATIC FEATURE BASED MALWARE CLUSTERING

BACKGROUND

1. Field of Disclosure

The disclosure generally relates to the field of computer science, in particular to detecting malicious software.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware. Accordingly, there is a need for new techniques that can reliably detect malware.

SUMMARY

Embodiments of the present disclosure include methods (and corresponding systems and computer program products) for classifying unknown files as malicious or legitimate taking into account sequences of operation codes in machine language instructions of the unknown files.

One aspect of the present disclosure is a computer-implemented method for detecting malware, comprising: extracting a machine language instruction sequence from a computer file, wherein the machine language instruction sequence comprises at least two machine language instructions of different length; encoding the machine language instruction sequence into a standardized opcode sequence, wherein opcodes in the standardized opcode sequence corresponding to the at least two machine language instructions are of a same length; generating a feature for the computer file based on the standardized opcode sequence; and classifying the computer file as malware based at least in part on the feature.

Another aspect of the present disclosure is a computer system for detecting malware, comprising: a non-transitory computer-readable storage medium storing executable computer program code for: extracting a machine language instruction sequence from a computer file, wherein the machine language instruction sequence comprises at least two machine language instructions of different length; encoding the machine language instruction sequence into a standardized opcode sequence, wherein opcodes in the standardized opcode sequence corresponding to the at least two machine language instructions are of a same length; generating a feature for the computer file based on the standardized opcode sequence; and classifying the computer file as malware based at least in part on the feature; and a processor for executing the computer program code.

Still another aspect of the present disclosure is a non-transitory computer-readable storage medium encoded with executable computer program code for detecting malware, the computer program code comprising program code for: extracting a machine language instruction sequence from a computer file, wherein the machine language instruction sequence comprises at least two machine language instructions of different length; encoding the machine language instruction sequence into a standardized opcode sequence, wherein opcodes in the standardized opcode sequence corresponding to the at least two machine language instructions are of a same length; generating a feature for the computer file based on the standardized opcode sequence; and classifying the computer file as malware based at least in part on the feature.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
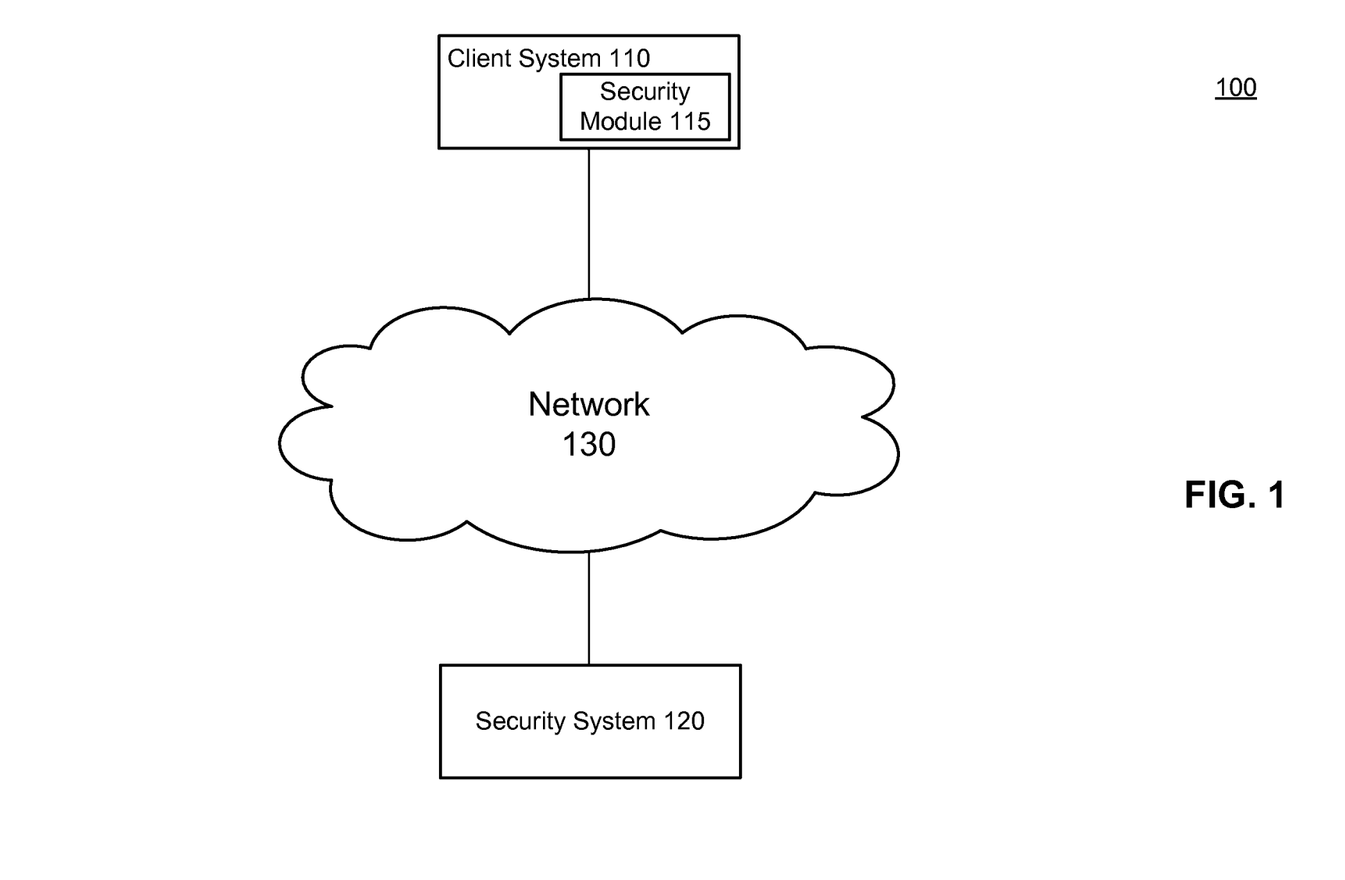
FIG. 1 is a high-level block diagram of a computing environment according to one embodiment of the present disclosure.

FIG. 1 is a high-level block diagram that illustrates a computing environment 100 for classifying unknown files as malicious or legitimate taking into account sequences of operation codes in machine language instructions of the unknown files, according to one embodiment of the present disclosure. As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client system 110 executes a security module 115 for detecting the presence of malware. The security module 115 can be, for example, incorporated into the OS of the computer or part of a separate comprehensive security package. In one embodiment, the security module 115 is provided by the entity that operates the security system 120. The security module 115 monitors computer files within the client system 110 and collects information related to file attributes and/or behaviors.

The security module 115 communicates with the security system 120 via the network 130. The security module 115 transmits to the security system 120 information related to files within the client system 110 (e.g., attributes such as metadata and/or behaviors) along with file identifiers (e.g., hash fingerprints) and/or copies of the files, and receives from the security system 120 classifications (e.g., malicious or legitimate) of the files. For example, the security module 115 can be configured to periodically transmit to the security system 120 information related to files recently created (e.g., downloaded) or modified within the client system 110 or transmit such information to the security system 120 in real-time as it is collected. In one embodiment, the transmission of information related to a newly created file constitutes a request to the security system 120 to classify the file. The security module 115 enforces an applicable security policy based on the received classification for the file. For example, if a computer file is classified as malware, the security module 115 may remediate the malware by prohibiting the computer file from running, quarantining/cleaning/deleting the computer file, and/or generating a warning message, depending on the policy. On the other hand, if the computer file is classified as legitimate, the security module 115 may permit the computer file to run on the client system 110, and/or stop monitoring the computer file or only monitor loosely.

The security system 120 is a hardware device and/or software program configured to receive information related to computer files from the client systems 110, and classify these files as legitimate or malicious. An example of the security system 120 is a web-based system providing security software and services allowing the security module 115 to detect and remediate malware on the client systems 110.

The security system 120 classifies a computer file by first grouping the file into a cluster of files with similar static features, and then determining the classification of that file based on the classifications of other files that belong to the same cluster. In order to generate the static feature used to group the file, the security system 120 first encodes operation codes in machine language instructions of the file into a standard format with a uniform length (also called the "standardized opcode"), and then generates the static feature based on the resulting standardized opcode sequence. An example static feature of a file is a multi-dimension vector where each element corresponds to the number of occurrences of a distinct N-gram in the standardized opcode sequence of that file. An N-gram is a sequence of N consecutive standardized opcodes, wherein N can be any positive integer (e.g., 3, 4).

One or more of the functions of the security system 120 can also be executed on the client system 110 or in a cloud computing environment. As used herein, cloud computing refers to a style of computing in which dynamically scalable and often virtualized resources are provided as a service over the Internet. Thus, cloud computing customers generally do not own the physical infrastructure serving as host to the software platform in question, but instead rent usage of resources from a third-party provider, where consume these resources as a service and pay only for resources used.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
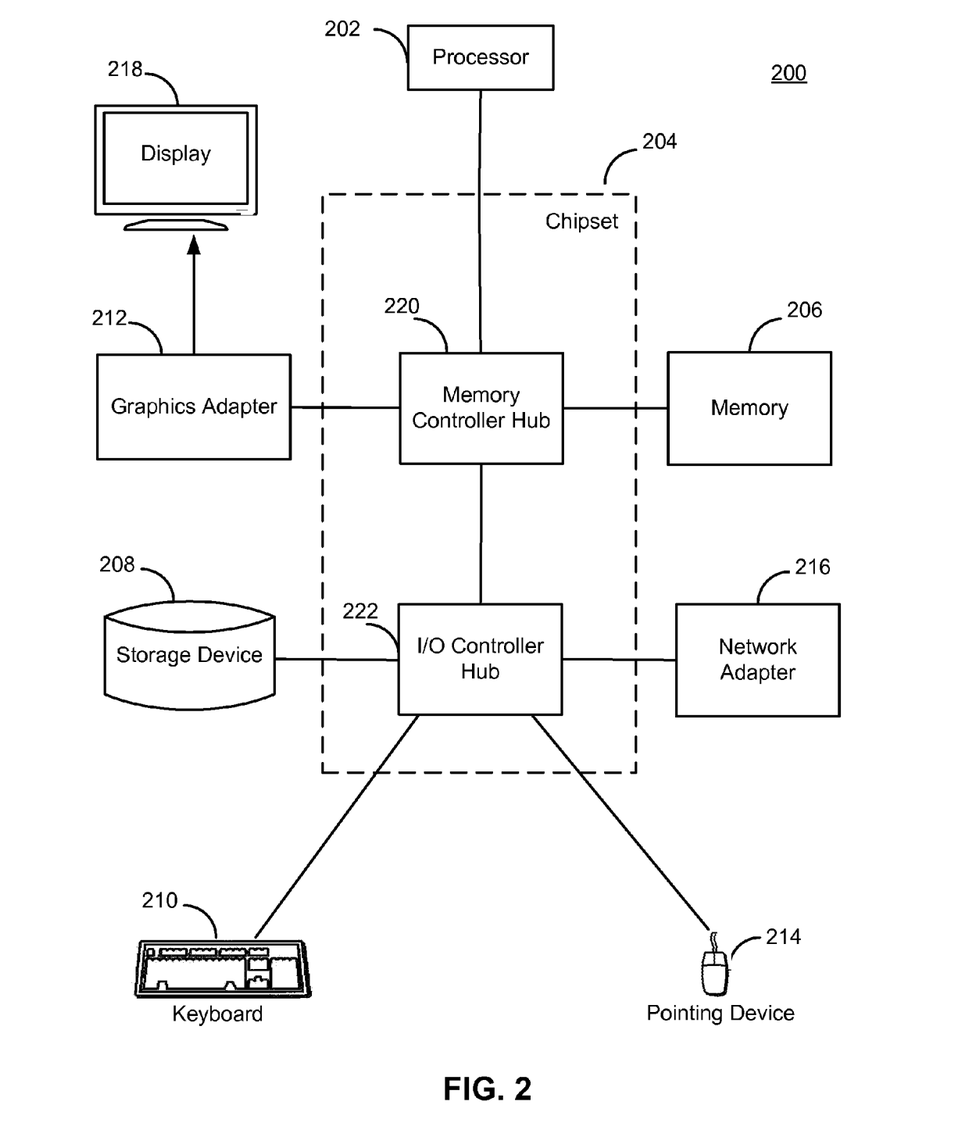
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security System

Figure 3:
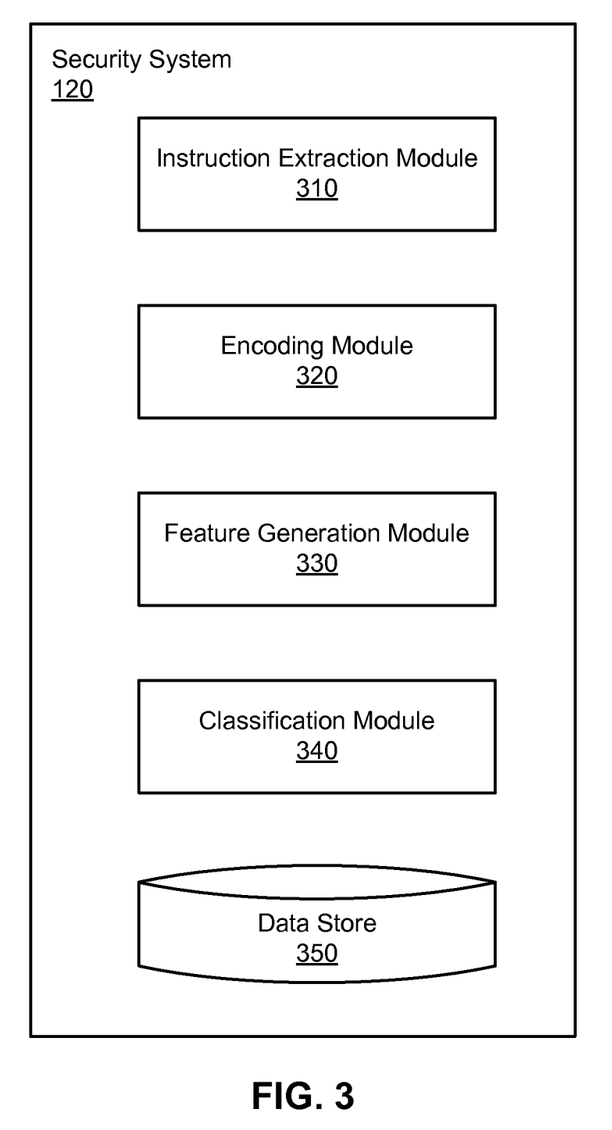
FIG. 3 is a high-level block diagram illustrating modules within a security system according to one embodiment of the present disclosure.

FIG. 3 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes an instruction extraction module 310, an encoding module 320, a feature generation module 330, a classification module 340, and a data store 350.

The instruction extraction module 310 retrieves machine language instructions in a computer file. A machine language instruction is an instruction that can be executed directly by a computer's central processing unit ("CPU"). Depending on the computer architecture on which a computer file is intended to execute, the computer file includes machine language instructions defined in the corresponding instruction set architecture. For example, a portable executable ("PE") file supporting the x86 architecture of INTEL CPUs includes machine language instructions defined in the x86 instruction set. A machine language instruction may have several fields: an operation code field ("opcode") specifying the operation to be performed, optionally an addressing mode field (also called the "ModR/M"), and optionally one or more operands (e.g., addresses, constant values).

The instruction extraction module 310 analyzes a computer file to determine the supported instruction set (e.g., by analyzing the file header, metadata), and retrieves the machine language instruction sequence of the computer file according to the format of the supported instruction set. In one embodiment, the instruction extraction module 310 applies a disassembler for the supported instruction set to parse the computer file, and retrieves the machine language instruction sequence of the computer file from the disassembler.

Software developers may protect the machine language instructions in a computer file (e.g., a PE file) against disassembling and reverse engineering by applying various protection techniques that encrypt and/or compress the content of the computer file. In order to retrieve the machine language instructions of a protected file, the instruction extraction module 310 executes the file (e.g., in a virtual machine) such that the file decrypts and/or extracts the machine language instructions in memory, and then analyzes the memory dump of that file to retrieve the machine language instructions.

The encoding module 320 encodes operation codes in machine language instructions of a computer file into a standard format with a uniform length (also called the "standardized opcode set") based on the applicable instruction set. In one embodiment, opcodes in the standardized opcode set are 2 bytes long and uniquely correspond to the operation codes in the machine language instructions (i.e., different opcodes in the applicable instruction set correspond to different opcodes in the standardized opcode set).

Machine language instructions in an instruction set are typically of different lengths, and often include fields other than the opcode. For example, machine language instructions in the x86 instruction set (also called the "x86 instructions") do not have a fixed-length, and have the following format:

0-4 byte optional prefix|1-3 byte Opcode|1 byte ModR/M|other operand fields

The prefix for 2-byte opcodes is 0x0F, and the prefixes for 3-byte opcodes are either 0x0F38 or 0x0F3A. Some of the 1-byte and 2-byte opcodes belong to an extension group in which bits 3-5 of the ModR/M byte function as an extension to the opcodes and are used to construct the actual opcodes. For clarity, the primary byte of an opcode (i.e., the first byte of a 1-byte opcode, the second byte of a 2-byte opcode, and the third byte of a 3-byte opcode) is called the "primary opcode", and the 3-bit extension (i.e., the third, fourth and fifth bits of the ModR/M byte of a x86 instruction in the extension group) is called the "sub opcode". The extension group includes the following 1-byte opcodes: 0x80, 0x81, 0x82, 0x83, 0xC0, 0xC1, 0xD0, 0xD1, 0xD2, 0xD3, 0xF6, 0xF7, 0xFE, 0xFF; the following 2-byte opcodes: 0x0F00, 0x0F01, 0x0FC7, 0x0F71, 0x0F72, 0x0F73; and no 3-byte opcode. For example, the x86 instruction "81 EC 28 03" corresponds to "sub esp, 328h" in assembly language, and the x86 instruction "81 F9 08 02" corresponds to "cmp ecx, 208h" in assembly language, even though the primary opcodes for both x86 instructions are both "81". The 1-byte opcode "81" belongs to the extension group, and the differences in the corresponding assembly language instructions are caused by the different sub opcodes (e.g., bits 3-5 of "EC" versus bits 3-5 of "F9").

An example encoding scheme designed to encode x86 instructions into the standardized opcode set is described below. In the following description, opcodes in the standardized opcode set (also called the "standardized opcodes") are all 2 bytes long and are denoted as "C1 C2" (first byte, second byte). The primary opcode in an x86 instruction is denoted as P_o, and the sub opcode is denoted as Sub_o.

For a 1-byte opcode (i.e., opcodes of x86 instructions with no prefix), the encoding module 320 determines whether the opcode belongs to the extension group. If the opcode belongs to the extension group, the encoding module 320 sets C1=Sub_o and C2=P_o. Otherwise the encoding module 320 sets C1=0x00 and C2=P_o.

For a 2-byte opcode (i.e., opcodes of x86 instructions with 0x0F as prefix), the encoding module 320 determines whether the opcode belongs to the extension group. If the opcode belongs to the extension group, the encoding module 320 sets C1=0x0F+Sub_o and C2=P_o. In this case, P_o takes a value from the set {0x00, 0x01, 0xC7, 0x71, 0x72, 0x73}. Otherwise the encoding module 320 sets C1=0x0F and C2=P_o.

For a 3-byte opcode (i.e., opcodes of x86 instructions with 0x0F38 or 0x0F3A as prefix), the encoding module 320 sets C2=P_o, and sets C1 depending on the value of the prefix: if the prefix is 0x0F38 then C1=0x25, otherwise (the prefix is 0x0F3A) C1=0x26.

The above encoding scheme guarantees that there is no collision between encoded opcodes because different types of opcodes in the x86 instruction set occupy disjoint encoding spaces in the standardized opcode set. Specifically, the encoding of 1-byte, 2-byte, and 3-byte opcodes ranges from 0x0000 to 0x07FF, 0x0F00 to 0x16FF, and 0x2500 to 0x26FF, respectively. The encoding scheme can also be easily extended to accommodate any new machine language instruction that may be added later.

The feature generation module 330 generates a static feature for a computer file based on the standardized opcode sequence encoded for that file. In one embodiment, the feature generation module 330 detects occurrences of unique N-grams (unique sequences of N consecutive standardized opcodes) by moving a fixed-length window (e.g., 2N bytes) over the standardized opcode sequence and considering a subsequence of N standardized opcode (i.e., an N-gram) at each position. Examples of the value of N include positive integers such as 3 and 4. Let S represents a set of all possible unique N-grams and |S| represents the total number of N-grams in S. The static feature is represented as a |S|-dimension vector where each element corresponds to the number of occurrences of a unique N-gram. The similarity between two static features is computed as their Euclidean distance in the |S|-dimension vector space where each dimension is the number of occurrence of one particular N-gram.

The classification module 340 classifies a computer file by first grouping the file into a cluster of files with similar static features, and then determining the classification of that file based on the classifications of other files that belong to the same cluster. In one embodiment, the classification module 340 is first trained using machine learning to cluster a large collection of computer files with known classifications into clusters of similarly classified files based on similarities of their static features. The resulting clusters are called the "classification clusters", and are used by the classification module 340 to classify computer files with unknown classifications.

In one embodiment, in order to group a computer file into a cluster, the classification module 340 measures similarities between the static feature of that computer file with the static features of the files in the classification clusters, and groups the computer file into one of the classification clusters based on proximity of the static features in the |S|-dimension vector space (e.g. the cluster of which the average distance between the target computer file and the cluster member files is the shortest). The classification module 340 classifies the computer file based on the classification of the files in the same cluster. For example, if most of the files in the cluster are classified as malware, then the classification module 340 also classifies the computer file as malware. On the contrary, if most of the files in the cluster are classified as legitimate, then the classification module 340 also classifies the computer file as legitimate. The classification module 340 may also consider features other than the |S|-dimension vector to classify the computer file. For example, if the files in the cluster do not have a predominant classification, then the classification module 340 may classify the file based on other features of the computer file such as its runtime behavior.

In another embodiment, the classification module 340 generates a representative computer file for each classification cluster, such as the cluster centroid (i.e., the average of all cluster member files of the classification cluster in the |S|-dimension vector space), and assigns a classification for the representative computer file based on the classifications of the cluster member files in the same classification cluster (e.g., the dominating classification among the cluster member files). In order to group a computer file into a cluster, the classification module 340 determines the closest cluster representative, and compares the distance between the computer file and the closest cluster representative with a threshold value (e.g., the cluster radius, i.e., the average of the distances between the cluster representative and the cluster member files in the same classification cluster). If the distance does not exceed the threshold value, the classification module 340 groups the computer file into the classification cluster represented by the closest cluster representative, and classifies the computer file based on the classification of the closest cluster representative.

The data store 350 stores data used by the security system 120. Examples of such data include the standardized opcode set, the classification clusters, and information about the client systems 110, to name a few. The data store 350 may be a relational database or any other type of database.

Overview of Methodology for the Security System

Figure 4:
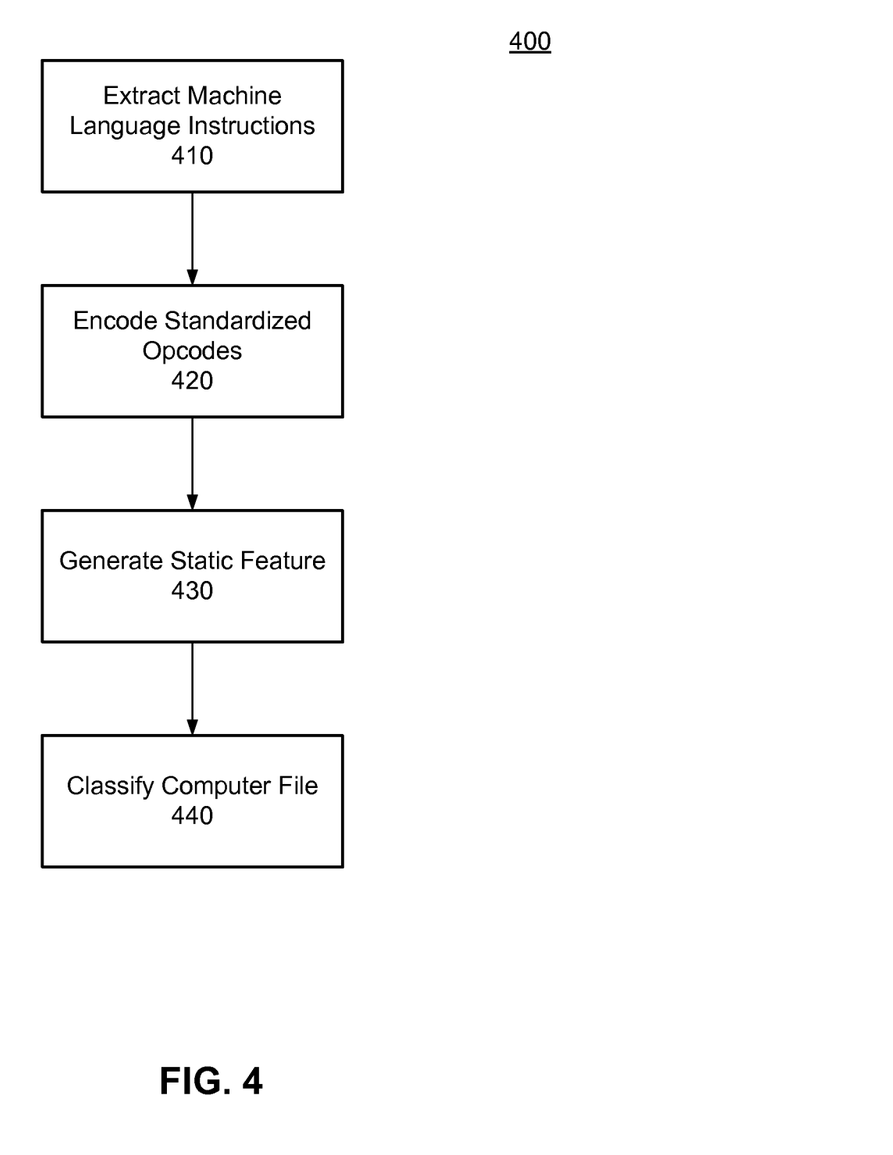
FIGS. 4 and 5 are flow diagrams collectively illustrating a process for classifying unknown files as malicious or legitimate taking into account sequences of operation codes in machine language instructions of the unknown files according to one embodiment of the present disclosure.

FIG. 4 is a flow diagram illustrating a process 400 for the security system 120 to classify unknown files as malicious or legitimate taking into account sequences of operation codes in machine language instructions of the unknown files, according to one embodiment. Other embodiments can perform the steps of the process 400 in different orders. Moreover, other embodiments can include different and/or additional steps than the ones described herein.

The security system 120 extracts 410 a machine language instruction sequence of a target computer file. In one embodiment, in order to extract 410 the machine language instruction sequence, the security system 120 first executes the target computer file, and then analyzes a memory dump of the target computer file to extract the machine language instruction sequence.

The security system 120 encodes 420 operation codes in the machine language instruction sequence of the target computer file into a standardized opcode sequence. Unlike the machine language instructions, the standardized opcodes do not include operands and are uniform in length.

The security system 120 generates 430 a static feature of the target file based on the standardized opcode sequence encoded for the target file. In one example, the static feature is a multi-dimension vector where each element corresponds to the number of occurrences of a unique N-gram (i.e., unique sequence of N consecutive standardized opcodes) in the standardized opcode sequence.

Figure 5:
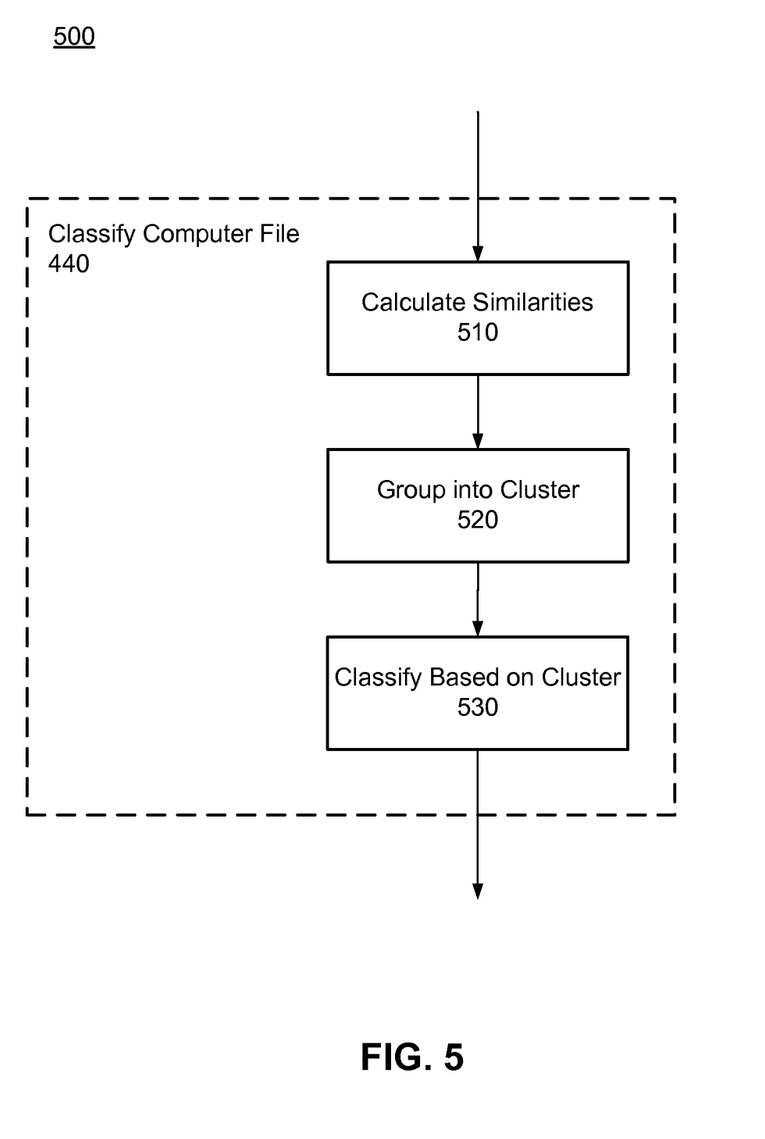

The security system 120 classifies 440 the target computer file. The classification step 440 is illustrated in FIG. 5 and described in detail below. Referring now to FIG. 5, a flow diagram illustrating a process 500 for the security system 120 to classify the target file, according to one embodiment. Other embodiments can include different and/or additional steps than the ones described herein at different sequences. As shown, the security system 120 first measures 510 distances (i.e., in the |S|-dimension vector space) between the static feature of the target file and the static features of representative computer files of the classification clusters to identify a closest representative computer file. If the distance between the target file and the closest representative computer file is less than a threshold value (e.g., the average distance between the representative computer file and the cluster member files in the same classification cluster), the security system 120 then groups 520 the target file into the classification cluster with the closest representative computer file, and classifies 530 the target file based on the classification of the closes representative computer file.

Experiments and Additional Embodiments

An example of the described embodiments was applied to classify a collection of computer files. The example shows that the described technique can cluster a large amount of computer files in a short period of time, and can use the resulting clusters to classify computer files at a high-degree of accuracy rate with a low false positive rate.

In one embodiment, the described techniques are implemented primarily in the backend security system as a backend analysis process based on information provided by the frontend security modules. The backend analysis process creates the classification clusters (e.g., based on manually labeled training computer files) and classifies computer files residing on the client systems by grouping the computer files into the classification clusters. In another embodiment, the backend security system creates the classification clusters and distributes the static feature (e.g., the |S|-dimension vector) of the representative computer file along with an associated classification and threshold value (e.g., the average of distances between the representative computer file and files in the cluster associated with the representative computer file) for each classification cluster to the frontend security modules. The security modules can then classify local computer files based on their proximities to the representative computer files.

The static feature (e.g., the |S|-dimension vector) generated based on the standardized opcode sequence is more reliable than static features generated from the original x86 instructions. Dynamic transformations (e.g., relinking, rebinding, and rebasing) can significantly change operand values and thus render the static features generated based on the x86 instruction sequence unreliable for the purpose of characterizing the underlying operation flows. On the other hand, the standardized opcode sequence only includes the opcode portions of the original machine language instruction sequence without the operand values, and thus the static feature generated based on the standardized opcode sequence precisely and efficiently captures the instruction semantics (e.g., operation flows) of the underlying computer file. In addition, because standardized opcodes are uniform in length, the standardized opcode sequence is well suited for the N-gram based similarity measurement. Accordingly, the static features (e.g., the |S|-dimension vector) derived from the standardized sequences accurately characterize the instruction semantics of the underlying computer files, and their similarities are good measurements of similarities of underlying operation flows. Because most malware appear to have been derived from the same code base, most new malware would either share exact instruction semantics with existing malware or have only slight variants. Accordingly, static features generated based on standardized opcode sequences can effectively cluster such malware together and thus provide an automated, efficient, effective, and scalable technique to detect malware. One skilled in the art would understand that the described embodiments can be applied to detect malware of a wide range of instruction sets beside the x86 instruction set.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for classifying unknown files as malicious or legitimate taking into account sequences of operation codes in machine language instructions of the unknown files. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting malware, comprising:
    extracting a machine language instruction sequence from a computer file of unknown classification, wherein the machine language instruction sequence comprises opcodes of different length and associated operand values;
    encoding the opcodes in the machine language instruction sequence into a standardized opcode sequence, the standardized opcode sequence including the opcodes without the associated operand values, wherein the opcodes in the standardized opcode sequence have a uniform length;

generating a static feature for the computer file based on the standardized opcode sequence, wherein the static feature comprises a vector describing the standardized opcode sequence; and classifying the computer file as malware based at least in part on the static feature, wherein the classifying comprises:

grouping the computer file into a cluster of computer files having similar vectors; and classifying the computer file as malware based on classifications of the computer files in the cluster.

2. The method of claim 1, further comprising:
grouping a plurality of computer files with known classifications into a plurality of clusters that includes the cluster, wherein at least one of the clusters comprises computer files that have a same classification.

3. The method of claim 1, wherein at least one element of the vector corresponds to a number of occurrences of a unique sequence of N consecutive standardized opcodes (N-gram) in the standardized opcode sequence.

4. The method of claim 3, wherein the vector is a multi-dimensional vector, each dimension of the vector is associated with a unique N-gram, and each element of the vector comprises a number of occurrences of a unique N-gram associated with a corresponding dimension.

5. The method of claim 1, wherein grouping the computer file into a cluster comprises:
determining a similarity between the vector for the computer file and vectors of the computer files in the cluster responsive to distances between the vector for the computer file and the vectors of the computer files in a vector space.

6. The method of claim 5, wherein grouping the computer file into a cluster comprises:
generating a representative computer file for a classification cluster of computer files with similar static features and assigning a classification for the representative computer file based on classifications of the computer files in the classification cluster; and
grouping the computer file into the classification cluster responsive to a first distance between the computer file and the representative computer file associated with the classification cluster being smaller than a second distance between the computer file and another representative computer file associated with another classification cluster, and the first distance not exceeding a threshold value.

7. The method of claim 6, wherein the threshold value comprises an average of distances between the representative computer file and files in the classification cluster.

8. The method of claim 1, wherein classifying the computer file as malware based on classifications of the computer files in the cluster comprises:
responsive to at least most of the computer files in the cluster being classified as malware, classifying the computer file as malware.

9. The method of claim 1, wherein extracting comprises:
executing the computer file; and
analyzing a memory dump of the computer file to extract the machine language instruction sequence.

10. The method of claim 1 wherein machine language instructions in the machine language instruction sequence comprises instructions defined in the x86 instruction set.

11. A computer system for detecting malware, comprising:
a non-transitory computer-readable storage medium storing executable computer program code for:
extracting a machine language instruction sequence from a computer file of unknown classification, wherein the machine language instruction sequence comprises at least two opcodes of different length and associated operand values;
encoding the opcodes in the machine language instruction sequence into a standardized opcode sequence, the standardized opcode sequence including the opcodes without the associated operand values, wherein the opcodes in the standardized opcode sequence have a uniform length;
generating a static feature for the computer file based on the standardized opcode sequence, wherein the static feature comprises a vector describing the standardized opcode sequence; and
classifying the computer file as malware based at least in part on the static feature, wherein the classifying comprises:
grouping the computer file into a cluster of computer files having similar vectors; and
classifying the computer file as malware based on classifications of the computer files in the cluster; and
a processor for executing the computer program code.

12. The computer system of claim 11, wherein the non-transitory computer-readable storage medium further comprises executable computer program code for:
grouping a plurality of computer files with known classifications into a plurality of clusters that includes the cluster, wherein at least one of the clusters comprises computer files that have a same classification.

13. The computer system of claim 11, wherein the vector is a multi-dimensional vector, each dimension of the vector is associated with a unique N-gram, and each element of the vector comprises a number of occurrences of a unique N-gram associated with a corresponding dimension.

14. The computer system of claim 11, wherein classifying the computer file as malware based on classifications of the computer files in the cluster comprises:
responsive to at least most of the computer files in the cluster being classified as malware, classifying the computer file as malware.

15. A non-transitory computer-readable storage medium encoded with executable computer program code for detecting malware, the computer program code comprising program code for:
extracting a machine language instruction sequence from a computer file of unknown classification, wherein the machine language instruction sequence comprises opcodes of different length and associated operand values;
encoding the opcodes in the machine language instruction sequence into a standardized opcode sequence, the standardized opcode sequence including the opcodes without the associated operand values, wherein the opcodes in the standardized opcode sequence have a uniform length;
generating a static feature for the computer file based on the standardized opcode sequence, wherein the static feature comprises a vector describing the standardized opcode sequence; and
classifying the computer file as malware based at least in part on the static feature, wherein the classifying comprises:

grouping the computer file into a cluster of computer files having similar vectors; and classifying the computer file as malware based on classifications of the computer files in the cluster.

16. The storage medium of claim 15, wherein the computer program code further comprises program code for:

grouping a plurality of computer files with known classifications into a plurality of clusters that includes the cluster, wherein at least one of the clusters comprises computer files that have a same classification.

17. The storage medium of claim 15, wherein the vector is a multi-dimensional vector, each dimension of the vector is associated with a unique N-gram, and each element of the vector comprises a number of occurrences of a unique N-gram associated with a corresponding dimension.

* * * * *